(12) United States Patent
Humphreys et al.

(10) Patent No.: US 10,914,073 B2
(45) Date of Patent: Feb. 9, 2021

(54) CURTAIN DIE FOR APPLYING A LIQUID RELEASE AGENT TO A SHINGLE SUBSTRATE

(71) Applicant: TAMKO Building Products, Inc., Joplin, MO (US)

(72) Inventors: David Humphreys, Joplin, MO (US); Christopher Freeborg, Frisco, TX (US); Alex Alekhine, University Park, TX (US); Kyle Davis, Grand Prairie, TX (US)

(73) Assignee: TAMKO Building Products LLC, Galena, KS (US)

( * ) Notice: Subject to any disclaimer, the term of this patent is extended or adjusted under 35 U.S.C. 154(b) by 106 days.

(21) Appl. No.: 15/997,524

(22) Filed: Jun. 4, 2018

(65) Prior Publication Data

US 2018/0281017 A1    Oct. 4, 2018

Related U.S. Application Data

(63) Continuation-in-part of application No. 14/622,855, filed on Feb. 14, 2015, now Pat. No. 10,113,314.

(60) Provisional application No. 61/944,458, filed on Feb. 25, 2014.

(51) Int. Cl.
| | | |
|---|---|---|
| *B32B 3/10* | (2006.01) | |
| *E04D 1/20* | (2006.01) | |
| *B05D 1/30* | (2006.01) | |

(52) U.S. Cl.
CPC ............. *E04D 1/20* (2013.01); *B05D 1/305* (2013.01); *B32B 2395/00* (2013.01); *B32B 2419/00* (2013.01); *B32B 2419/06* (2013.01); *Y10T 428/24802* (2015.01)

(58) Field of Classification Search
None
See application file for complete search history.

(56) References Cited

U.S. PATENT DOCUMENTS

| | | | |
|---|---|---|---|
| 3,813,280 A | 5/1974 | Olszyk et al. | |
| 3,973,887 A | 8/1976 | Breckenfelder | |
| 5,932,287 A * | 8/1999 | Michelsen | E04D 5/02 427/209 |
| 6,143,812 A | 11/2000 | Martin et al. | |
| 6,506,444 B1 | 1/2003 | Mahr et al. | |

(Continued)

FOREIGN PATENT DOCUMENTS

EP    0541311 A1    10/1992

*Primary Examiner* — Christopher M Polley
(74) *Attorney, Agent, or Firm* — Husch Blackwell LLP

(57) ABSTRACT

An asphalt shingle manufacturing machine that includes a curtain die for applying a liquid release layer on an asphalt coated substrate. The moisture of the liquid release layer evaporates leaving a dispersed solid particulate release layer. The curtain die includes a first body section and a second body section with a shim disposed between the body sections to define a distribution channel. The second body section may include chamber manifold defined therein to store a volume of liquid release agent. The distribution channel places the chamber manifold in fluid communication with a discharge outlet of the curtain die in order to disperse a volume of liquid release agent from a chamber manifold out of the discharge outlet. The shim may be configured to define a width of the distribution channel to determine the flow rate and discharge pattern of the liquid release agent.

11 Claims, 8 Drawing Sheets

(56) References Cited

U.S. PATENT DOCUMENTS 7,977,259 B2 7/2011 Ratcliff et al.
2004/0127614 A1 7/2004 Jiang et al.

\* cited by examiner

CURTAIN DIE FOR APPLYING A LIQUID RELEASE AGENT TO A SHINGLE SUBSTRATE

CROSS-REFERENCE TO RELATED APPLICATION

This application claims the benefit of U.S. Provisional Patent Application No. 61/944,458 filed Feb. 25, 2014, the entire disclosure of which is hereby incorporated by reference. This application is a continuation-in-part of U.S. patent application Ser. No. 14/622,855 filed Feb. 14, 2015, the entire disclosure of which is hereby by reference.

FIELD OF THE INVENTION

This present invention relates to a device for applying a liquid applied release agent to the top or bottom surface of an asphalt roofing shingle and methods for applying the liquid applied release agent on the shingle.

BACKGROUND OF INVENTION

Asphalt roofing shingles commonly used on commercial or residential structures are generally made in a known method which includes an asphalt coated substrate. During the manufacturing process, a substrate sheet or web is coated with hot asphalt before being processed through a series of rollers or drums that press and evenly apply the hot asphalt onto the substrate sheet. The substrate sheet or web may be any one known in the art or hereafter developed for asphalt roofing shingles, including a fiberglass mat, a polyester mat, or an organic paper mat, such as those made from materials such as recycled cardboard or paper, or a woven or non-woven mat made from a fibrous material such as cellulose fibers, synthetic fibers, mineral fibers and the like, or any mixture thereof. The substrate sheet is also typically coated with one or more layers of weathering materials to protect the roofing shingles from natural elements such as ultraviolet rays, rain, snow and the like and is then cooled. After cooling, the sheet is cut into a plurality of individual shingles of desired size and the individual shingles are then stacked in bundles for shipment.

Because the asphalt applied to the substrate sheet is both hot and sticky, it has a tendency to stick to the rollers and/or drums associated with the manufacturing equipment that coat and press the asphalt onto the substrate. As a result, prior to making contact with certain rollers and/or drums, an aggregate layer is normally applied to prevent the hot, sticky asphalt from sticking to or gumming up the rollers during the manufacturing process. Presently, roofing shingle manufacturers add colored granules to the front surface to protect the weathering side of the shingle and cheaper, non-sticking silicon particulates, such as sand or talc, to one side of the hot asphalt layer to prevent the substrate from sticking to the rollers. Using a granular aggregate backing particulate material like sand, talc, mica, coal slag fines, or volcanic ash has a significant downside as explained below.

Sand and other backing particulates are expensive, especially when purchased and used in high volume, as in the roofing shingle manufacturing process. Sand and other particulates are generally abrasive and penetrate the moving parts of the manufacturing equipment. The abrasive edges of the backing particulates cause serious wear and tear to the rollers, drums, gears and other mechanisms associated with the equipment. Repairing and replacing manufacturing equipment is expensive. Using sand and these other aggregate backing particulates also creates waste as more backing material is applied than necessary to ensure complete coverage of the surface. In addition, sand and other aggregate backing particulates potentially expose employees engaged in the manufacturing process to silica that may subject the employees to harmful health effects.

Some surfactant-based liquid backing agents have been utilized in asphalt-based roofing manufacturing, but several shortcomings have come to light during their use. In many cases, the surfactant-based liquid backing agents generate large quantities of foam due to the entrainment of air during the application process or as a result of turbulence and cavitation that can occur at friction points in the process that introduce drag forces onto the coated web. Traditional methods of applying a surfactant-based liquid backing agent inevitably result in the creation of foam. Sprayers aerate the liquid as it is applied, and inking rolls create turbulence in a bath. Foaming in the process creates a number of issues including, but not limited to substrate handling issues due to loss of tension on the substrate, increased rates of rusting, and product quality problems as a result of the transfer of the liquid release agents to undesirable parts of the product due to dispersion of the foamed liquid release agent.

It is therefore desirable to develop a liquid release agent and methods for applying the same for use in the process of manufacturing roofing shingles wherein the liquid release agent and associated methods effectively prevent hot asphalt from sticking to rollers, drums and other surfaces used in the manufacturing process and likewise prevent the individual shingles from sticking to one another when stacked, stored, and/or shipped. Removing silica or sand from the manufacturing process will likewise improve employee working conditions and employee health and safety by making it easier to reduce or eliminate employee exposure to silica fines and dust. Further, removing silica, sand and the other backing particulates from the manufacturing process is likely to increase equipment reliability, sustainability, reduce maintenance costs and may reduce raw material volume and cost.

In addition, there is need in the art to provide a device and a method of applying a surfactant-based liquid release agent that does not result in excessive amounts of foam, and that evenly disperses the liquid release agent so the result is a dispersed solid particulate release agent after the moisture evaporates from the liquid release agent.

Accordingly, the present invention is directed to overcoming one or more of the problems as set forth above.

SUMMARY OF THE INVENTION

The manufacture of typical asphalt roofing shingles is well known in the art. The present invention eliminates the use of sand and other backing particulates and discloses the use of a liquid release agent applied to the back side of the shingle to prevent the asphaltic surface of the shingle from bonding with surfaces associated with the manufacturing equipment such as roller surfaces when the asphaltic surface comes into contact with such surfaces during the manufacturing process and may prevent the individual shingles from sticking to each other during stacking, storage and/or shipping of the shingles in bundles.

In the process by which roofing shingles are manufactured, a substrate sheet, typically made from a material such as fiberglass, enters the roofing shingle manufacturing equipment before being coated with hot, sticky asphalt. As the substrate sheet travels through the equipment, the substrate sheet is coated with asphalt and then travels through a series of rollers or drums where the asphalt is pressed, rolled, cooled and cut into individual sized shingles. The substrate sheet is also commonly referred to as a web. Presently in the art, particulate and/or granular material is applied to the top weathering surface and backing particulates such as sand, talc, mica, coal slag fines, or volcanic ash are applied to the bottom surface of the web on top of the asphalt coating and/or a reinforcing fabric or film applied to the bottom surface before the bottom surface touches a roller or other surface, the backing particulates preventing the asphalt on the bottom surface of the web from sticking to the rollers or other surfaces of the manufacturing equipment. In one embodiment, a reinforcing fabric or film may also be applied to the bottom surface of the asphalt coated web prior to or in place of the application of the backing particulates.

The present invention relates generally to use of a liquid release agent on asphalt roofing shingles to prevent sticking during the manufacturing and storage of the shingles, to reduce or eliminate the use of backing aggregate or particulate materials and correlative employee exposures to silica and nuisance dust, and to prevent wear and tear to the manufacturing equipment due to the use of aggregate backing materials. As used herein, the liquid release agent or surfactant-based liquid backing agent are collectively referred to herein as the liquid release agent. More specifically, the present invention relates to methods for applying a liquid release agent (in lieu of aggregate surfacing materials such as sand and talc) to the back side of shingles during the manufacturing process in order to reduce the degree to which the shingles stick to drums, rollers or other surfaces associated with the manufacturing equipment. Use of a liquid release agent and methods by which the agent is applied also may prevent shingles stacked in bundles from sticking to one another. Use of a liquid release agent may also eliminate employee exposure to silica and dust from backing aggregates. The liquid release agent is applied as a liquid, but as the liquid is applied to the bottom coated surface of the shingle, the moisture evaporates and a particulate solid release agent remains.

The present invention replaces the backing aggregate or particulates applied to the bottom asphaltic and/or film/fabric coated surface of the shingle with a liquid release agent, such as an alkaline soap, silicone emulsion, wax (paraffin, carnauba, etc.), wax emulsions (acrylics, polyethylene, or polypropylene), synthetic polymer resins, oil emulsions, or other liquid release agent or water-based solution now known or hereafter developed. The liquid release agent may be applied before the bottom asphaltic and/or film/fabric coated surface of the web touches a roller or other surface and, more particularly, it may be applied after the point at which the asphaltic coating is applied to the bottom surface of the web, such as upon exiting the coater and before entering the cooling section but prior to the bottom surface of the web contacting any surface associated with the manufacturing process. In one embodiment of the present invention, the release agent is applied by way of a spray. The spray may be applied in a uniform, homogeneous application to the bottom surface of the web or alternatively, the spray may be applied in a non-homogeneous pattern such as in lanes, zones or sections. It is recognized and anticipated that the liquid release agent may take on many different formulations and that other agents including desired non-stick outcome are also envisioned.

In an alternative embodiment, the liquid release agent may be applied to the bottom asphaltic and/or film/fabric coated surface of the coated web using a roller instead of a spray application. In this embodiment, a roller located downstream in the manufacturing process sits and rotates at least partially in a liquid release agent bath. As the roller rotates, a portion of the roller is always present in the liquid release agent, thereby continuously coating the outer surface of the roller with the liquid release agent. Thus, the coated web contacts the outer surface of the roller coated with the liquid release agent as it passes over or under the roller, and the roller applies a layer of the liquid release agent to the bottom surface of the asphalt coating layer on the web.

After the liquid release agent is applied to the asphalt coating layer and/or film or fabric, the web sheet goes through a series of rollers that press the coated web into its final thickness. Additional layers of asphalt and other materials such as films, fabric and other granules can be applied on the coated web to make it more durable, flexible and resistant to natural elements.

The present method may also include a second application of the liquid release agent applied subsequent to either of the aforementioned processes. In the second application, the liquid release agent is intended to prevent individual shingles from sticking to one another when they are cut and stacked for packaging and shipment. In one embodiment, the second application can take place after the web has been totally processed and subsequent or prior to cutting the web into individual, pre-sized shingles, but prior to stacking. This second application of liquid release agent preferably occurs prior to the web entering the cutting rollers, but could occur after the shingles are cut.

In the second application, the liquid release agent can be again applied in a spray application or by a roller where the application pattern is an even homogeneous application, or alternatively, the agent can be applied by a spray or roller application in a non-homogeneous pattern such as in zones, lanes or sections. By applying the liquid release agent prior to cutting the web, when individual roofing shingles are subsequently stacked for packaging, storage or shipping, the individual shingles will not stick to one another. In addition, application points may be disposed after the cutter. For example, to improve the liquid release coverage on the shingles.

In another embodiment, the liquid release agent is applied to the back of an asphalt coated roofing shingle substrate in a controlled quantity by utilizing a curtain die to coat the substrate. The curtain die may include two body sections and a shim of a predetermined thickness disposed between the two body sections. The coating die may define a manifold chamber that stores a predetermined volume of the liquid release agent and then disperses the liquid release agent through a discharge outlet or slot created between the two body sections by the shim. A constant pressure head may be maintained in the manifold chamber of the die using a pump upstream to pump the liquid release agent from a run storage tank. The shim may be modified or configured to created exclusion zones to block flow of the liquid release agent to undesirable parts of the roofing shingle. A smoothing blanket or smoothing roll may also be disposed downstream the curtain die application to spread the stripped/ribboned liquid release agent on the substrate into the voids between the ribbons.

In one embodiment, the applied liquid release agent is capable of preventing shingles from adhering together under a number of environmental conditions including exposure to a pressure of nearly zero up to around four (4) pounds per square inch, and at temperatures of around eighty (80) degrees Celsius or below, or any combination of the aforementioned pressures and temperatures.

Other aspects and advantages of the present invention will be apparent from the following detailed description of the preferred embodiments and the accompanying drawing figures.

BRIEF DESCRIPTION OF DRAWINGS

The accompanying drawings form a part of the specification and are to be read in conjunction therewith, in which like reference numerals are employed to indicate like or similar parts in the various views.

DETAILED DESCRIPTION

The following detailed description of the present invention references the accompanying drawings that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Figure 1:
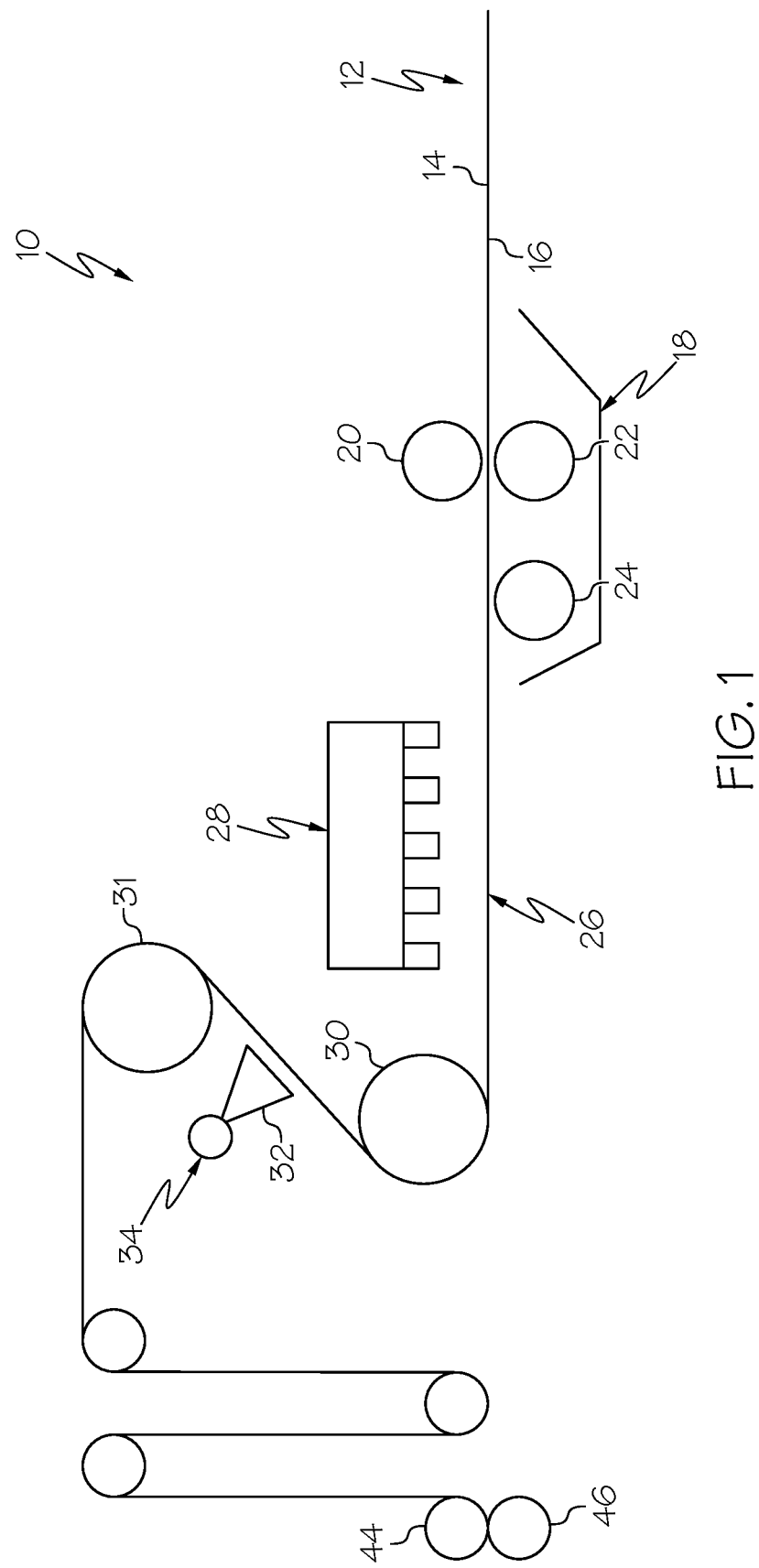
FIG. 1 is a partial schematic representation of equipment for manufacturing roofing shingles, the equipment arranged for a process of making roofing shingles which includes the application of a liquid release agent according to the teachings of the present invention.

FIG. 1 illustrates a schematic representation of the manufacturing equipment and process 10 for making roofing shingles. The equipment and process 10 uses methods known in the art to manufacture roofing shingles but further incorporates the present invention into the equipment and process 10. Although the manufacturing process 10 illustrated herein FIGS. 1, 4 and 5 may not be representative of the entire process, such processes are sufficient to describe the present invention. In the process 10 illustrated in FIG. 1, a substrate sheet 12 enters the overall apparatus to be coated with hot asphalt. The substrate 12 includes a top surface 14 which is typically coated with a plurality of granular and/or bituminous materials commonly known in the art, wherein the granular and bituminous materials protect the shingle, and consequently the roof, from the physical damage that can be caused by natural occurrences including ultraviolet rays, rain, snow, wind and other elements. The top surface 14 is also known in the art and referred to herein as the exposed surface 14. The surface opposite the exposed top surface 14 is the bottom surface 16 and this is the surface that lies adjacent to the roof surface. The bottom surface 16 is also known in the art and referred to herein as the unexposed surface 16.

The substrate sheet 12 may be composed of any material known in the art or hereafter developed for asphalt roofing shingles, including a fiberglass mat, a polyester mat, or an organic paper mat, such as those made from materials such as recycled cardboard or paper, or a woven or non-woven mat made from a fibrous material such as cellulose fibers, synthetic fibers, mineral fibers and the like, or any mixture thereof. Upon entering the coater 18, hot asphalt is applied to the top of the substrate sheet 12, and the substrate sheet 12 then travels through a pair of top/bottom measuring rollers 20 and 22. In this regard, the asphalt coating may be any asphalt type or mixture known in the art, such as any bituminous material suitable for use as a roofing material, such as asphalts, tars, pitches and mixtures thereof. The measuring rollers 20 and 22 act to ensure that the substrate sheet 12 is of appropriate thickness before being coated by the back coating roller 24. The back coating roller 24 coats the bottom surface 16 of the substrate sheet 12 with hot asphalt. In addition, the asphalt coating may include various additions and/or modifiers such as inorganic fillers, mineral stabilizers, organic materials including polymers and so forth. Once the substrate sheet 12 is coated with asphalt, the substrate sheet 12 is can also be referred to as a coated web 26. While FIG. 1 illustrates one means of applying hot asphalt to the bottom surface 16, it should be appreciated that other methods and processes for such application such as immersion coating, spray application, extrusion coating and the like may be employed when coating the substrate sheet 12 with hot asphalt.

After the hot asphalt is applied, the web 26 moves through a process wherein a blender 28 containing top-surface granules applies a granular surface coating to the top surface 14 of the web 26. The top-surface granules are commonly known in the art and they serve a number of functions including giving the shingles their distinctive appearance, and protecting the asphalt coating from the elements and UV damage. In some instances, a reinforcing film, fabric or layer may also be applied to the bottom surface of the coated web.

At this point in the prior art manufacturing process, a particulate such as sand or talc would normally be applied to the bottom surface 16 of the web 26 in order to prevent the bottom surface 16 from sticking to rollers, drums or other equipment surfaces downstream in the manufacturing process such as the top S-drum 31 illustrated in FIG. 1. The backing particulate also adds weight to the finished shingles. Because of the aforementioned detrimental consequences when sand or other particulates are used to prevent the bottom surface 16 from sticking to a roller or other downstream surface, the present invention incorporates a liquid release agent 32 that is applied to the bottom surface 16 of the web 26 instead of the backing particulate to accomplish this task. Liquid release agent 32 may be an alkaline soap, silicone emulsion, wax (paraffin, carnauba, etc.), wax emulsions (acrylics, polyethylene, or polypropylene), synthetic polymer resins, oil emulsions, or other liquid release agent or water-based solution or emulsion now known or hereafter developed. In a preferred embodiment, the liquid release agent 32 applied to the bottom surface 16 is an alkaline soap, silicone emulsion, or other water-based solution or emulsion. In one embodiment, the soap, water-based or other solution or emulsion may include a range of solids in percent solution, suspension or emulsion in the range from about 1% to about 40%. In another embodiment, the soap, water-based or other solution or emulsion may include a range of solids in percent solution, suspension or emulsion in the range from about 35% to about 75%. In another embodiment, the soap, water-based or other solution or emulsion may include a range of solids in percent solution, suspension or emulsion is around 60%.

The liquid release agent may be any industrial alkaline soap having basic properties and an ability to prevent the coated surface of the web from having a high affinity to bond with a roller or other surface associated with the manufacturing equipment. In one embodiment, the liquid release agent is an alkaline soap made by combining lye and an oil. In a preferred embodiment, the lye is potassium hydroxide, which is potash, and the oil is coconut oil.

Figure 2:
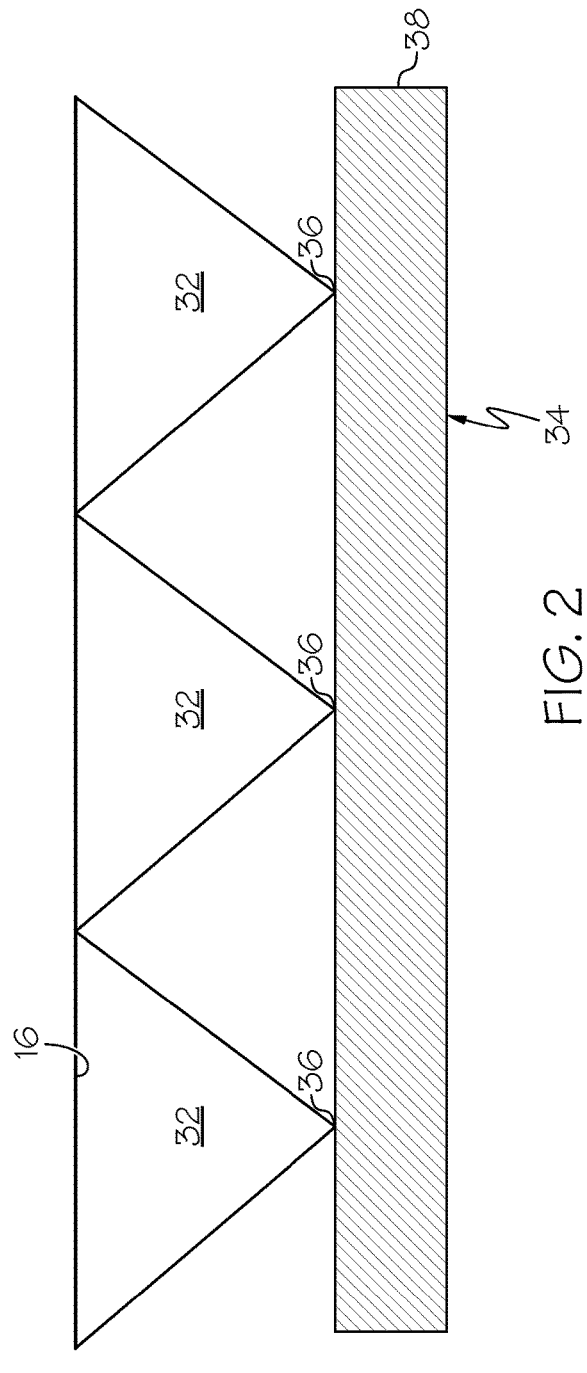
FIG. 2 illustrates a side elevation view of one embodiment of a spray nozzle arrangement for use in the equipment of FIG. 1 for applying a homogeneous application of the liquid release agent across a bottom surface of a coated web.
Figure 3:
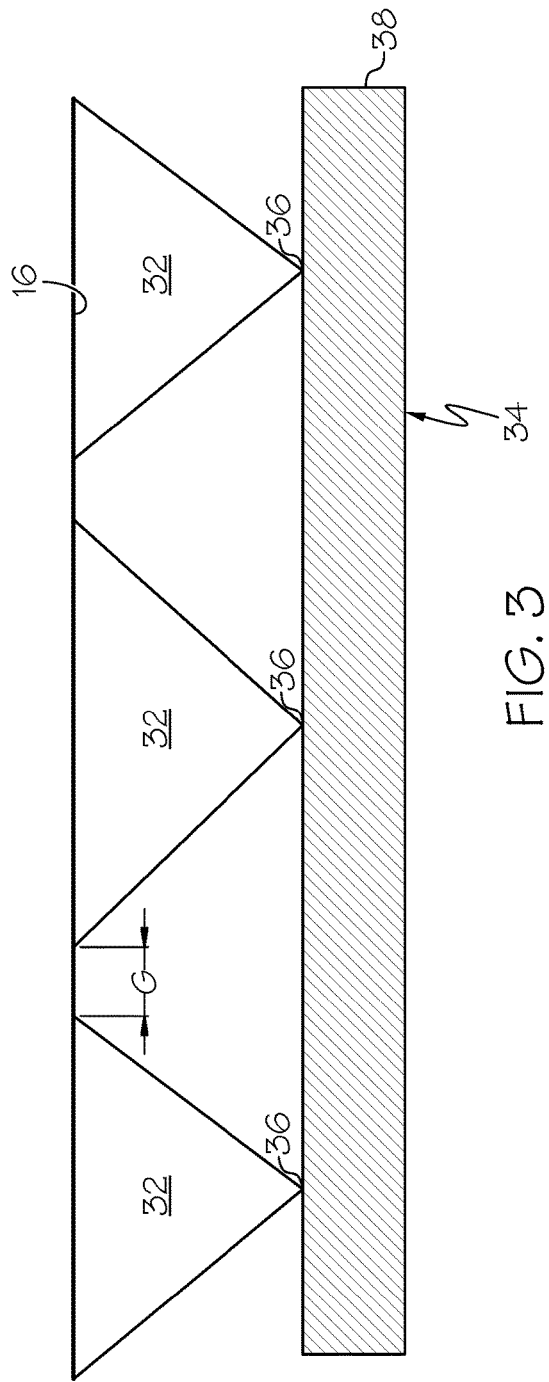
FIG. 3 illustrates a side elevation view of another embodiment of a spray nozzle arrangement for use in the equipment of FIG. 1 for applying a non-homogeneous application of the liquid release agent across a bottom surface of a coated web.

In the embodiment illustrated in FIG. 1, the liquid release agent 32 is applied via a spray mechanism such as a sprayer 34. FIG. 2 illustrates one application pattern in which the sprayer 34 may apply the liquid release agent 32 to the bottom surface 16, while FIG. 3 illustrates an alternative application pattern in which the sprayer 34 may apply the liquid release agent 32 to the bottom surface 16. In both embodiments, the sprayer 34 includes one or more nozzles 36 housed in a spray bar or spray manifold 38 associated with sprayer 34. In the application illustrated in FIG. 2, nozzles 36 of sprayer manifold 38 are positioned and located so as to apply the liquid release agent 32 in an even, homogeneous manner. By applying the liquid release agent 32 homogeneously, the bottom surface 16 of the web 26 will be completely and entirely coated with the liquid release agent 32.

In the alternative embodiment illustrated in FIG. 3, the nozzles 36 of sprayer manifold 38 are positioned and located so as to apply the liquid release agent 32 in a non-homogeneous manner across the bottom surface 16 of the web 26 such as in lanes, sections, dots, zones or other such patterns. As an example, the spray pattern in FIG. 3 of adjacent release agent 32 applications may be separated by a gap Gas shown. In doing so, the bottom surface 16 of web 26 will include a sufficient amount of the liquid release agent 32 to prevent the bottom surface 16 from sticking to a downstream roller or other surface of the manufacturing equipment, while not coating the entire bottom surface 16 with the agent 32, thus avoiding coating certain segments of the bottom surface as desired and possibly adding additional economy or providing one or more desired patterns of exposed portions of the coated web. As illustrated in FIG. 3, the bottom surface 16 is not completely coated with agent 32.

Figure 4:
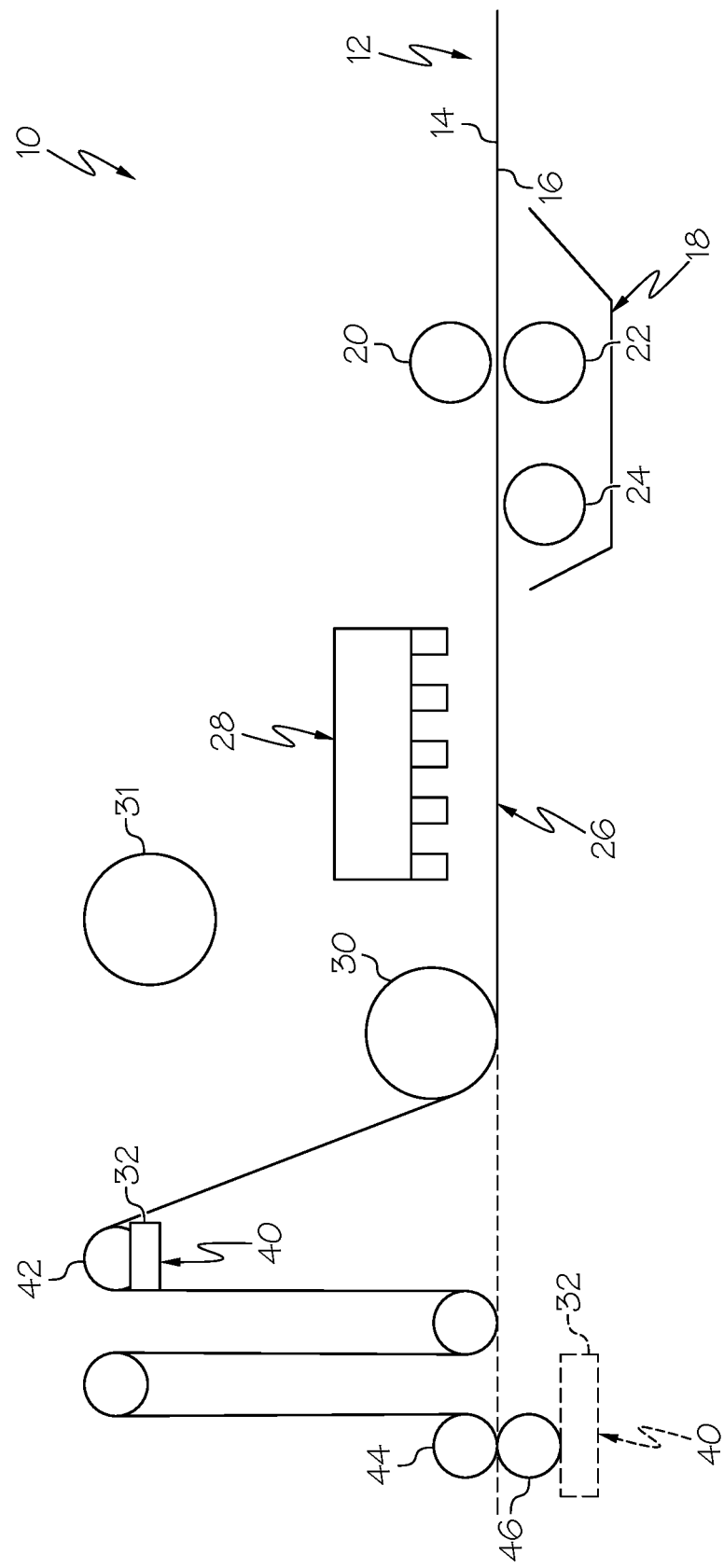
FIG. 4 is a partial schematic representation of another embodiment of the arrangement of equipment used to manufacture roofing shingles, the equipment the equipment arranged for a process of making roofing shingles which includes the application of a liquid release agent using a roller according to the teachings of the present invention.

In a separate alternative embodiment as illustrated in FIG. 4, the release agent 32 need not be applied via a spray application, but instead, it can be applied by means of a roller 42 in a liquid bath 40 of liquid release agent 32. In this embodiment, the liquid bath 40 is located downstream from the bottom S-drum 30 and the bath 40 is positioned and located such that a portion of a downstream roller 42 always is submerged in the liquid bath 40. Thus, as the roller 42 rotates and completes its circular motion, it passes into and out of the bath 40 thus coating the exterior roller surface with the liquid release agent 32. As the bottom surface 16 of web 26 travels across the top portion of roller 42, the liquid release agent 32 is applied to the bottom surface 16 of web 26 by contact with the roller's outer surface. This process is cyclical and because at least a portion of the circumference of the roller 42 is continuously submerged in the bath 40 and as the roller 42 rotates, the coated outer surface of the roller 42 continuously coats the bottom surface 16 of the web 26 with the liquid release agent.

It is also recognized and anticipated that the liquid bath 40 does not necessarily have to be positioned at roller 42. In an alternative embodiment, liquid bath 40 may be positioned at any roller downstream from coater 18 in the manufacturing process as long as the bottom surface 16 is coated before it makes contact with any roller or other surface. In this regard, note that the process illustrated in FIG. 4 has the web 26 bypassing the top S-drum 31 and, instead, the web 26 is fed directly to roller 42. Still further, an alternative web path is shown in FIG. 4 using dashed lines, which includes the web 26 being fed directly from the bottom S-drum 30 to the top and bottom press rollers 44 and 46 and the liquid bath 40 can be associated with the bottom press roller 46. Still other process configurations are anticipated and envisioned so long as the liquid release agent 32 is applied, via spray or bath, before any contact of the coated bottom surface 16 to any roller or other surface associated with the manufacturing equipment.

Figure 5:
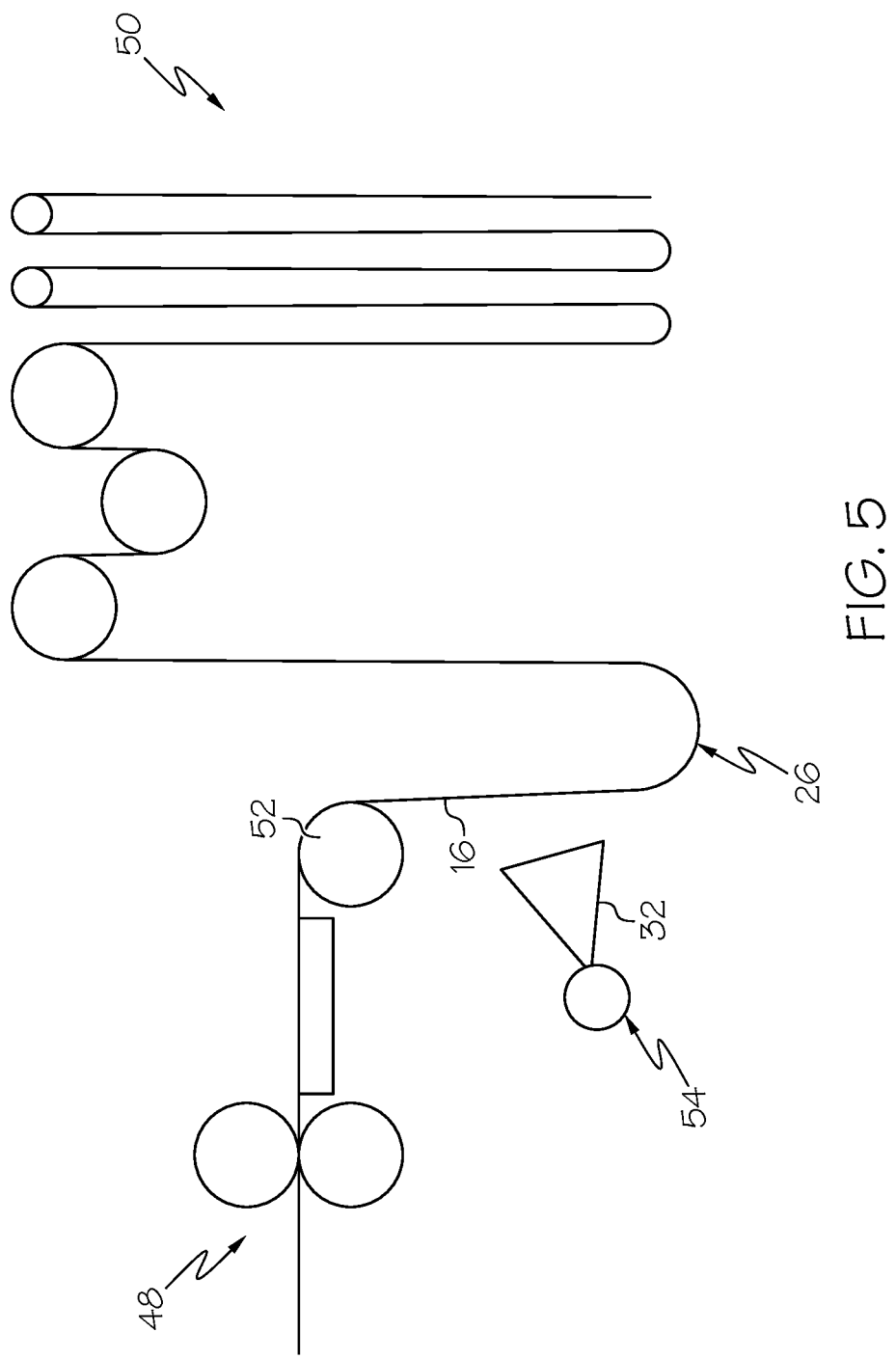
FIG. 5 is a partial schematic representation of another embodiment of equipment used to manufacture roofing shingles, the equipment arranged for a process of making roofing shingles which includes a second application of a liquid release agent at a second location.

In another embodiment of the present invention, subsequent to the initial application of the liquid release agent 32 to the bottom surface 16 of the web 26, either by the spray application or by liquid bath application, the liquid release agent 32 may be applied for a second time prior to the web 26 being cut into individual shingles. In this embodiment, the purpose of the second application is to prevent the individual cut shingles from sticking to each other when packaged in bundles for shipment. This embodiment is illustrated in FIG. 5 as explained below. It is also contemplated that this invention will require only a single application.

FIG. 5 is a partial schematic representation of the end portion of the manufacturing process illustrating the cutting rollers 48. The shingle may have already been processed through all coating and/or laminating stations for the particular asphalt shingle. After being processed through a plurality of drums, coaters, and/or rollers to prepare the web 26 to include the surfaces necessary to function as a roofing shingle, the web 26 may be cooled in cooling section 50 before entering the cutting rollers 48. Also, before entering the cutting rollers 48, such as just prior to the cutting guide roller 52, the liquid release agent 32 may be applied for a second time. This second application may be a spray application wherein a sprayer 54, substantially similar to the sprayer 34, applies the liquid release agent 32 to the bottom surface 16 of the web 26. As before, the application by the sprayer 54 may be homogeneous as illustrated in FIG. 2, or it may be non-homogeneous as illustrated in FIG. 3. It should be appreciated that the second application may likewise alternatively be a liquid bath application, similar to that described herein with respect to FIG. 4. It should also be noted that applications of the liquid release agent 32 after the first application may likewise take place at alternative or additional locations during the manufacturing process, such as after the cutting process, but prior to stacking the individual shingles. Moreover, the embodiment described above utilizes the same liquid release agent at both applications. However, different release agent formulations or materials may be utilized at the first and second application and performance may be increased through routine experimentation or trial and error.

After the liquid release agent 32 is applied to the bottom surface 16 of web 26, web 26 may be cut and packaged for shipping and storage. When the resultant individual shingles are shipped and stored, they are typically in a stacked arrangement. Environmental conditions experienced by the stacked shingles during storage and shipping have been noted to affect whether adjacent shingles in a stack adhere to each other after stacking. This is likely due to the fact that the asphalt, while a solid at most atmospheric environmental conditions, may become more fluid under certain pressures and/or temperatures or combinations thereof. In addition, the asphalt in the shingle may experience creep or flow when subject to certain pressures or temperatures over certain time durations. In one embodiment of the present invention, the second application of agent 32 to the bottom surface 16 described above may be formulated to render the shingles less likely to stick to each other when stacked and stored under certain environmental conditions.

Figure 6:
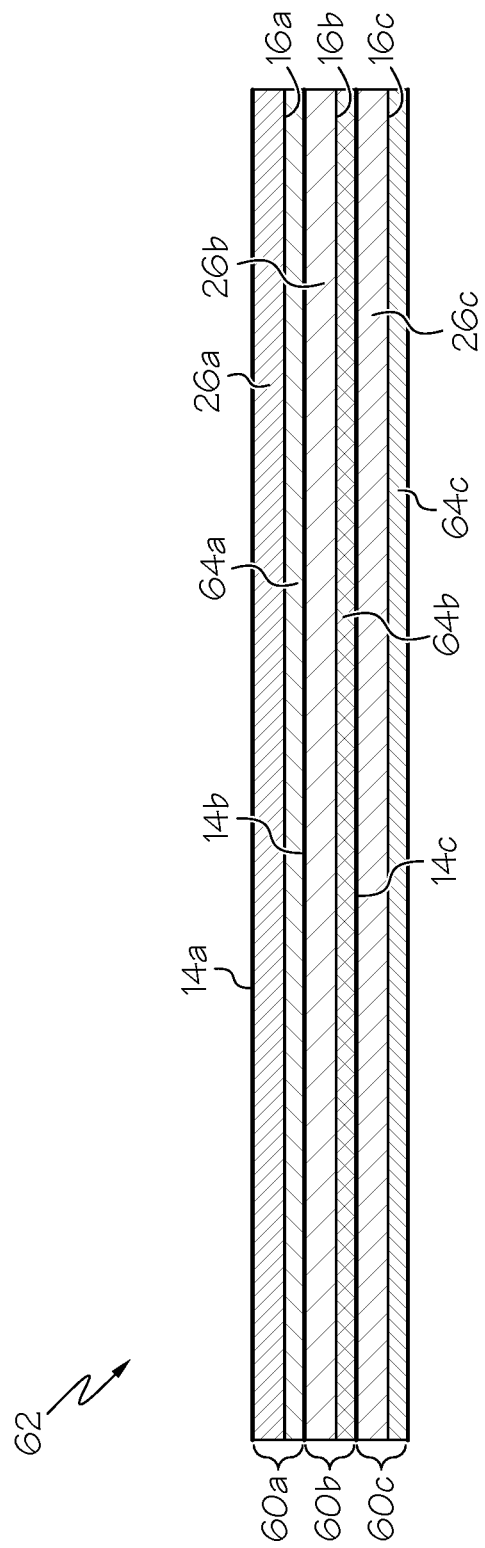
FIG. 6 is an end view of a stack of shingles manufactured according to the teachings of the present invention.

FIG. 6 illustrates a plurality of individual shingles 60a, 60b, and 60c in a stack 62 or stacking arrangement. As shown in FIG. 6, individual shingles 60a, 60b, and 60 have the same construction and comprise a respective web layer 26a, 26, and a layer 64 of liquid release agent 32. In one embodiment, the combined application of the layer 64 liquid release agent 32 is applied in a way which respective adjacent shingles 60a, 60b, and 60c in stack 62 resist adhering to each other under certain defined environmental conditions. For example, in one embodiment, the layer 64b the liquid release agent 32 is sufficient to prevent adhesion between an individual shingle 60b to an adjacent shingle 60c in stack 62 when exposed to a pressure of nearly zero up to around four (4) pounds per square inch. Similarly, the temperature at which shingles 60a, 60b, and 60c in stack 62 are stored also influences whether shingles 60a, 60b, and 60c in stack 62 will adhere through the respective separating layer 64 of liquid release agent 32. In one embodiment, the layer 64 of liquid release agent 32 prevents the adhesion of shingles 60a, 60b, and 60c in stack 62 exposed to a temperature of around eighty (80) degrees Celsius or below.

In addition to the above physical conditions individually, an embodiment of the liquid release agent 32 prevents adhesion between adjacent shingles 60a, 60b, and 60c in stack 62 in any combination of the above ranges. Thus, for example, an embodiment of liquid release agent 32 prevents adhesion between adjacent shingles 60a, 60b, and 60c in stack 62 when the shingles 60a, 60b, and 60c are stacked and stored, being exposed to a pressure up to around four (4) pounds-per-square-inch and a temperature of around eighty (80) degrees Celsius or below. In one embodiment, release agent 32 may prevent adhesion between adjacent shingles 60a, 60b, and 60c in stack 62 for at least fourteen (14) days. In a workable embodiment, the layer 64 of liquid release agent 32 prevents adhesion between individual shingle 60b an adjacent shingle 60c when exposed to a pressure of up to around three and six-tenths (3.6) pounds-per-square-inch, when exposed to a constant temperature of around seventy (70) degrees Celsius or below for at least fourteen (14) days.

It is also recognized and anticipated that the present manufacturing process and methods for applying a liquid release agent to the bottom surface of a substrate web material can be utilized with the manufacturing of any type of roofing shingle such as high impact resistant shingles and the like. It is recognized that the apparatus and methods described herein for apply a liquid release agent to the bottom surface can also be utilized to apply a liquid release agent to the top surface of the substrate web material as it travels through the manufacturing process. It is also recognized that a fabric material, films, and other materials and coatings can be applied to both sides of the substrate sheet to achieve any desired final shingle product. It is also recognized that other spraying apparatus or other fluid application apparatus may likewise be utilized to apply the present liquid release agent other than those methods disclosed herein.

Figure 7:
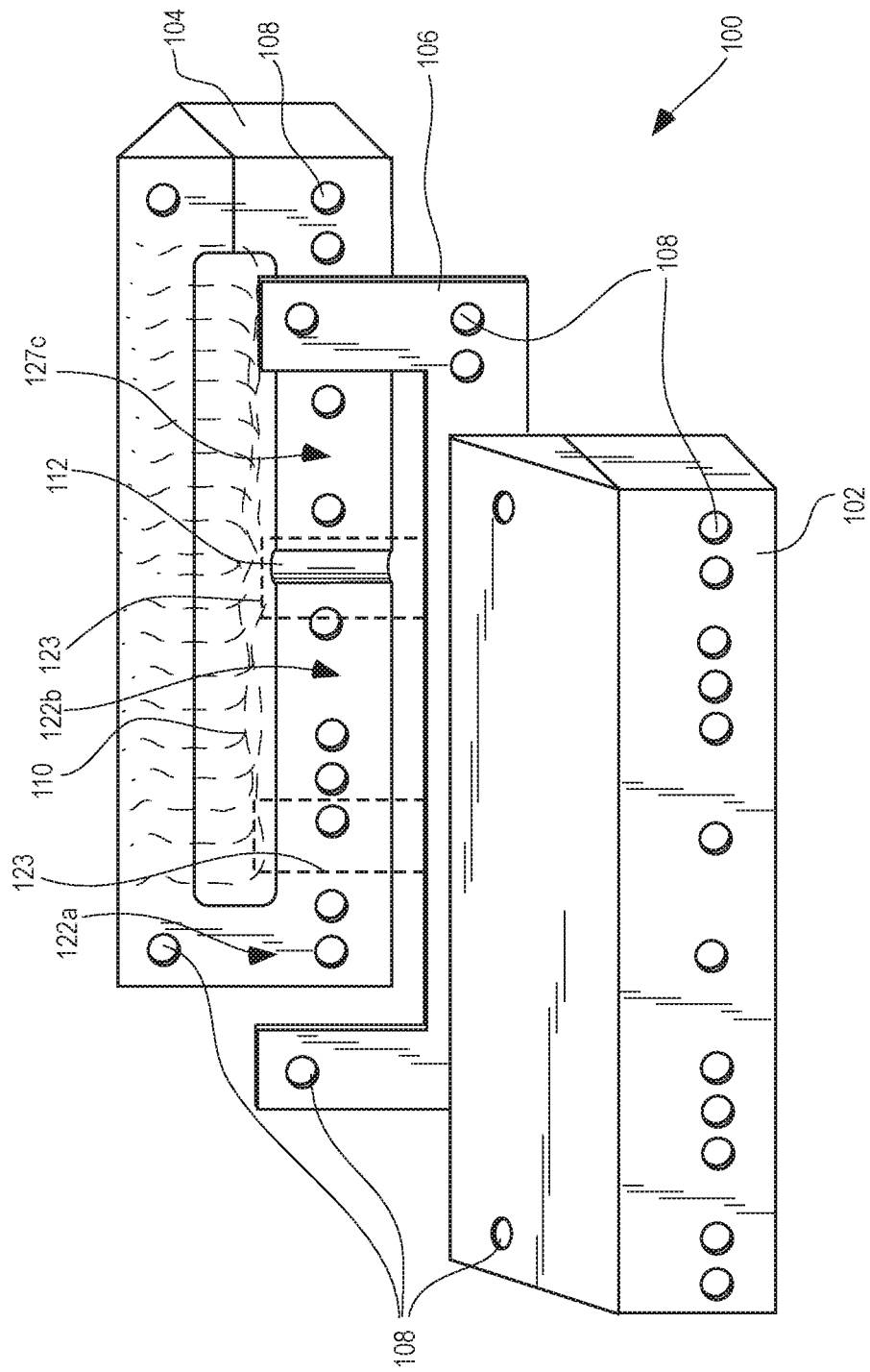
FIG. 7 is a perspective exploded view of one embodiment of a curtain die according to the teachings of the present invention.

FIGS. 7-11 illustrate an embodiment of a curtain die used in a shingle manufacturing machine, wherein the curtain die 100 applies the liquid release agent 62 to the shingle substrate 12. FIG. 7 shows curtain die 100 having a first body section 102 and a second body section 104 separated by a shim 106. First die section 102, shim 106 and second die 104 section may have a plurality of aligned bolt holes 108 so as to couple these elements together in a single assembly with bolts or other fasteners (not shown). Second body section 102 may include a cavity defined therein which is referred to as a manifold chamber 110 for storing a pre-determined volume of liquid release agent 32. A flow inlet 112 provides a channel which allows liquid release agent to be supplied into manifold chamber 110. Manifold chamber 110 may be configured for storing a particular volume of liquid release agent 32 and/or for providing a certain flow rate or, alternatively, maintains a pressure head in the chamber manifold 110 which results in discharging the liquid release agent 32 onto the substrate 12 at a pre-determined flow rate.

Figure 8:
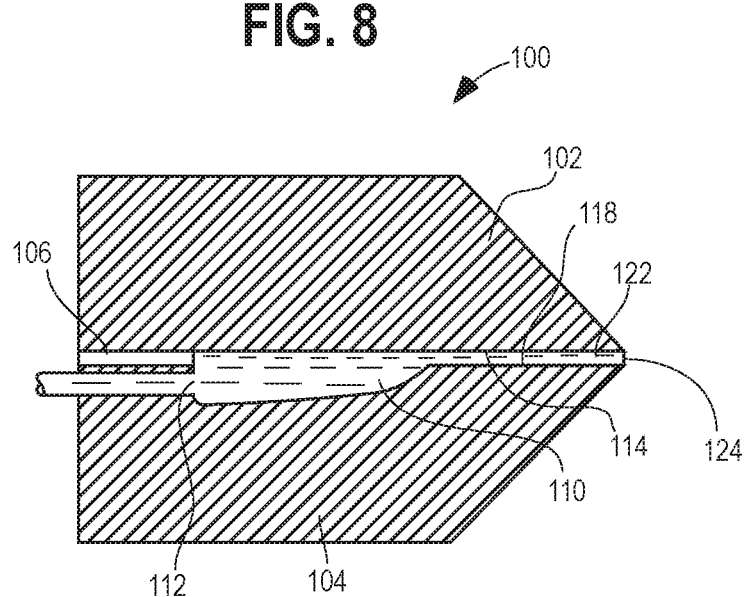
FIG. 8 is a section view of the curtain die of FIG. 7 cut along the line 8-8.

As shown in FIG. 8, first body section 102 of curtain die 100 has an interior face 114 and an exterior face 116. Second body section 104 of curtain die 100 has an interior face 118 and an exterior face 120. Shim 106 is disposed between interior face 114 of first body section 102 and interior face 118 of second body section 104, wherein interior face 114 is in an opposing relationship to interior face 118. Shim 106 has a thickness that separates the interior faces 114 and 118 to form a distribution channel 122 for liquid release agent 32 to travel from manifold chamber 110 to a discharge outlet 124. Shim 106 may have a thickness which defines the width of distribution channel, which is also the distance between interior faces 114 and 118. In one embodiment shim 106 may be configured so as to provide exclusion zones 123 (shown in FIG. 1 in broken lines as a leg of shim 106 which extends into the distribution channel 122) on the applied web by modification of the shim to block flow to undesirable parts of the roofing shingle substrate or to define an application pattern of the liquid release agent. In one embodiment, shim 106 may define a plurality of parallel and separate distribution channels (for example, shown as 122a, 122b and 122c in FIG. 1, the spaces between the exclusion zones 123) so as to apply a plurality of ribbons or stripes of release agent 32 on substrate 12.

Figure 9:
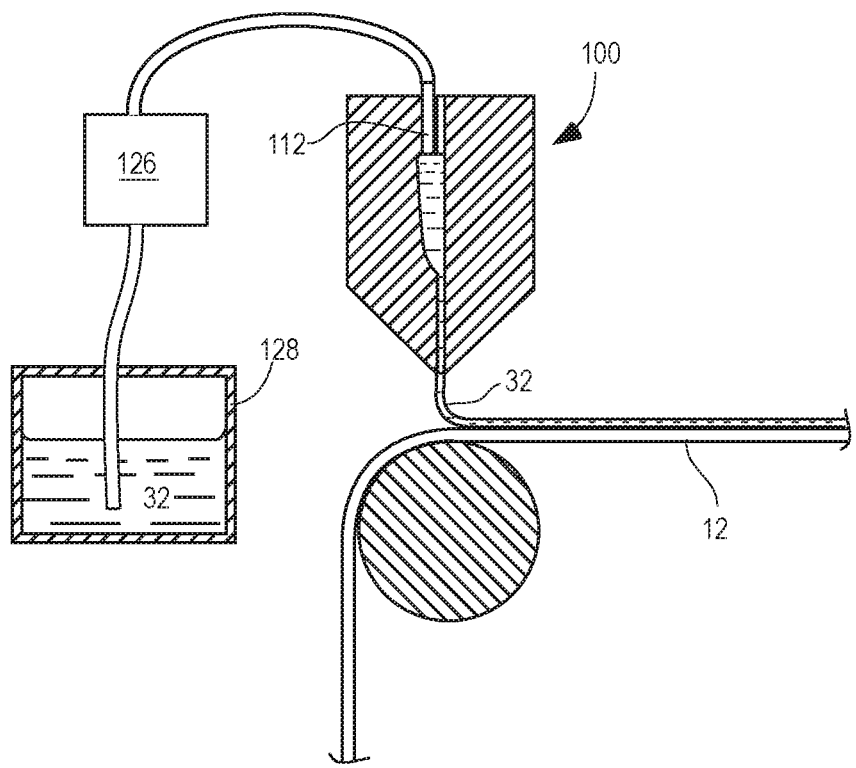
FIG. 9 is a section view of the curtain die of FIG. 7 cut along the line 8-8 and disposed above a coated substrate.

As shown in FIG. 9, curtain die 100 may be disposed above a coated shingle substrate 12 to apply liquid release agent 32 on substrate 12. In one embodiment, a constant pressure head may be maintained in the manifold chamber 110 of the die 100 using a pump 126 upstream of the die 100 pulling liquid release agent 32 from a run/storage tank 128 to chamber manifold 110. Pump 126 is in fluid communication with flow inlet 112 and run/storage tank 128. In one embodiment, the curtain die 100 is positioned in close proximity to the asphalt coating station such that the liquid release agent is applied when the asphalt is at a temperature between two hundred and four hundred-fifty (200-500) degrees Fahrenheit. Once the liquid release layer is applied, the moisture evaporates leaving a dispersed solid particulate release layer. In accordance with the above-described embodiments, a second curtain die may be disposed downstream in the manufacturing process prior to apply a second liquid release layer to provide a second layer of a dispersed solid particulate release layer. The second liquid release layer may be applied when the asphalt is in a range between one-hundred and two-hundred fifty (50-250) degrees Fahrenheit.

Figure 10:
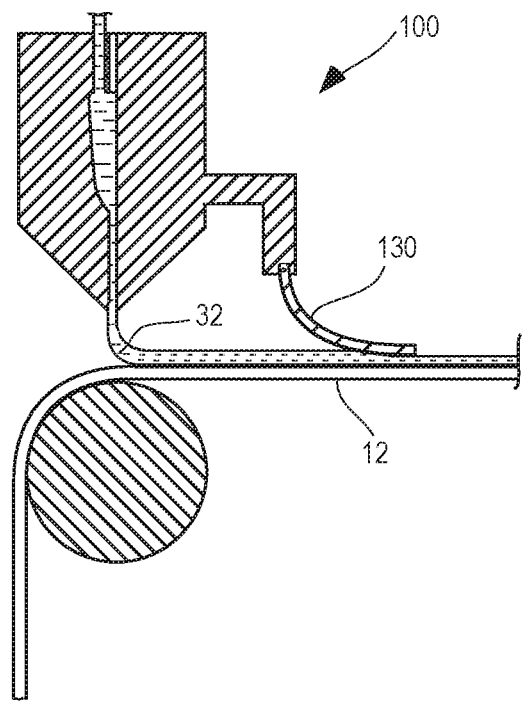
FIG. 10 is a section view of the curtain die of FIG. 7 cut along the line 8-8 and disposed above a coated substrate with an embodiment of a liquid release agent spreading flap.
Figure 11:
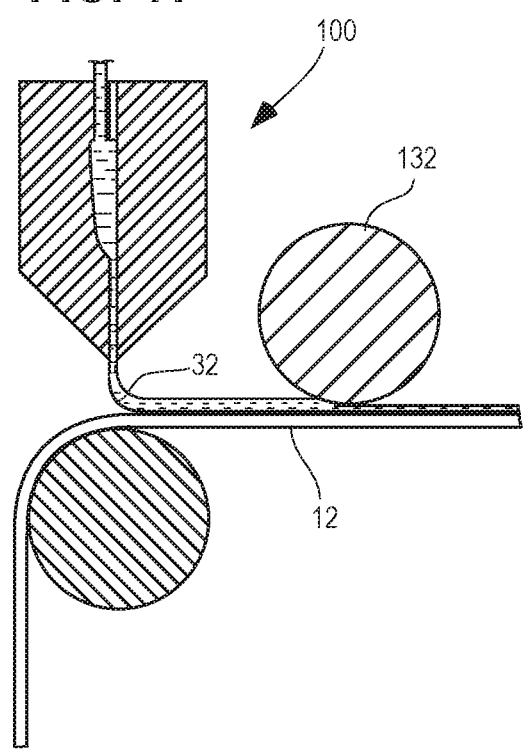
FIG. 11 is a section view of the curtain die of FIG. 7 cut along the line 8-8 and disposed above a coated substrate with an embodiment of a liquid release agent spreading roller.

Due to the low viscosity and surface tension of some of the surfactant based liquid release agents combined with the low flow rates required for the manufacturing roofing shingles, a traditional curtain coating on the continuous substrate often cannot be maintained, which results in the formation of an unstable and un-uniform curtain layer. The thickness of shims 106 can be selected or configured to create a ribboning effect on the dispersion of the liquid release layer to prevent the creation of an unstable curtain and to provide an equal flow of liquid release agent across the length of the die. The ribboning effect may result in a plurality of ribbons or stripes of liquid release agent 32 applied to the substrate wherein a void or space is present between ribbons or layers. In addition or in the alternative, FIG. 10 illustrates and embodiment including a smoothing blanket 130 disposed downstream of the curtain die 100 to smooth and spread out the ribbons of liquid release layer 32 on the substrate 12 into a liquid release layer having a substantially uniform thickness. FIG. 11 illustrates as similar embodiment showing a smoothing roller 132 disposed downstream of the curtain die 100 to spread the stripped liquid release agent 32 on the substrate 12 into the voids between the ribbons. Once the liquid release layer is applied, the moisture evaporates leaving a dispersed solid particulate release layer.

From the foregoing, it will be seen that this invention is one that is well adapted to attain all the goals and objects hereinabove set forth together with other advantages which are obvious and which are inherent to the equipment and methods disclosed herein. It will be understood that certain features and sub-combinations are of utility and may be employed without reference to other features and sub-combinations. This is contemplated by and is within the scope of this disclosure. Since many possible embodiments of the invention may be made without departing from the spirit and scope thereof, it is also to be understood that all disclosures set forth herein or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present equipment and method will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for manufacturing roofing shingles comprising the following step:
    applying a liquid release agent to a bottom surface of an asphalt coated substrate sheet using a curtain die subsequent to the substrate sheet being coated with asphalt and prior to the substrate sheet being cut into individual shingles.

2. The method of claim 1 further comprising the steps of storing a volume of liquid release agent in a manifold chamber of the die; and maintaining a constant pressure head in the manifold chamber during the applying the liquid release agent step using a pump upstream to pump the liquid release agent from a storage tank to said manifold chamber.

3. The method of claim 1 further comprising the step of defining a distribution channel in said curtain die using a shim disposed between a first body section and a second body section of said curtain die, and configuring a width of the distribution channel by selecting a thickness of shim, wherein a flow rate of the liquid release agent out of the curtain die is related to the width of said distribution channel.

4. The method of claim 1 further comprising the step of evaporating the moisture in a liquid release agent to result in a dispersed solid particulate release layer on said asphalt coated substrate.

5. The method of claim 1 further comprising the step of applying the liquid release agent on the asphalt coated substrate in a plurality of ribbons.

6. The method of claim 5 further comprising the step of smoothing out the ribbons of the liquid release agent using one of a smoothing blanket or a smoothing roller disposed downstream of the curtain die.

7. The method of claim 1 wherein the liquid release agent is an alkaline soap.

8. The method of claim 1 wherein the liquid release agent is comprised of a water-based material.

9. The method of claim 1 further comprising the step of applying a second liquid release agent to the bottom surface of the substrate sheet subsequent to applying the first liquid release agent and cooling the sheet, and prior to stacking individually cut shingles.

10. The method of claim 9 further comprising the step of cutting the asphalt coated substrate sheet subsequent to applying the second coat of the liquid release agent.

11. The method of claim 9 wherein the first release agent and the second release agent are the same.

* * * * *